Figure 1:
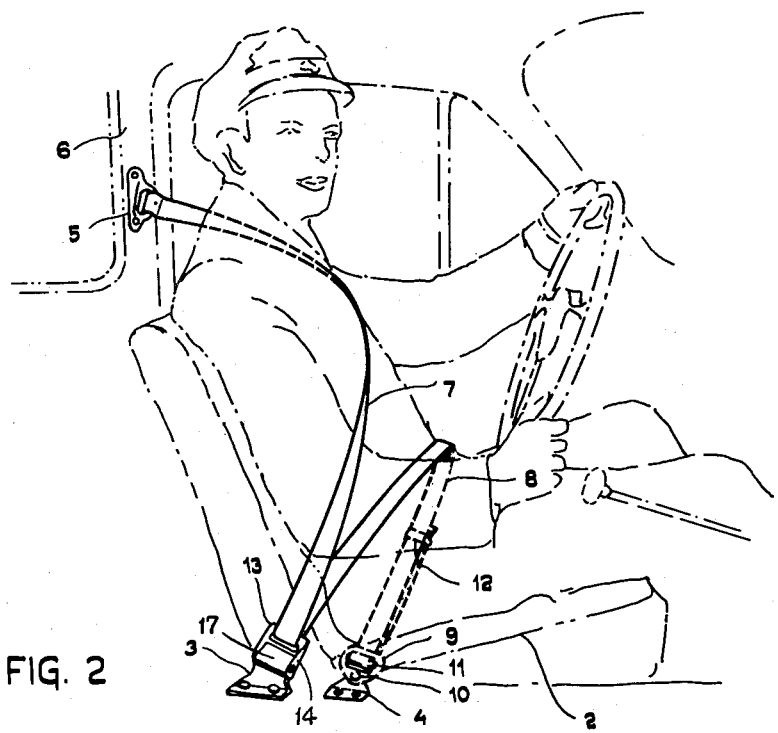

July 10, 1962     N. I. BOHLIN     3,043,625

SAFETY BELT

Filed Aug. 17, 1959

United States Patent Office 3,043,625
Patented July 10, 1962

3,043,625
SAFETY BELT
Nils Ivar Bohlin, Goteborg, Sweden, assignor to Aktiebolaget Volvo, Goteborg, Sweden, a corporation of Sweden
Filed Aug. 17, 1959, Ser. No. 834,258
Claims priority, application Sweden Aug. 29, 1958
2 Claims. (Cl. 297—389)

This invention relates to a safety belt for use in vehicles, especially road vehicles. Safety belts comprising a chest strap adapted to be strapped obliquely across the chest are frequently used in order to prevent a driver from being thrown against fore parts of the vehicle, such as a wind-shield or steering column, in case the vehicle is colliding or upon hard application of the brakes. In certain cases, the chest strap has been combined with a waist or hip strap adapted to be strapped across the waist.

Conventional safety belts comprising a chest strap and a hip strap are devised in such a manner that when stressed they transmit a substantial part of the load on the chest strap to the backrest of the seat and at the same time result in a substantially downwardly directed compressive force acting adversely on the spine. On closer examination it has been found that even at a low colliding speed the tension on the belt becomes considerable and it has also been found that even a non-foldable backrest of a conventional seat of a motor-car cannot completely resist the occurring stresses, the result being that the backrest is bent forward or that the seat becomes detached from its fastenings so that the load-resisting and retaining properties of the belt are impaired to such an extent that the strapped person is not safely prevented from being thrown against the wind-shield or steering column. It will be obvious that such types of safety belts are still more unsuitable in connection with seats having foldable backrests.

The object of the present invention is to provide a safety belt which independently of the strength of the seat and its connection with the vehicle in an effective and physiologically favourable manner retains the upper as well as the lower part of the body of the strapped person against the action of substantially forwardly directed forces and which is easy to fasten and unfasten and even in other respects satisfies rigorous requirements.

In its broadest aspect, the safety belt according to the invention is characterized in that the top end of the chest strap is connected, in a manner known per se, to a top mounting secured to the body or frame of the vehicle at a point substantially on a level with and substantially behind and on one side of the shoulder of the strapped person, that on either side of the seat of the vehicle a floor mounting is secured to the floor or the frame of the vehicle, that one end of the hip strap is connected to the floor mounting which is located on the same side as the top mounting, and that the chest strap and the hip strap form a continuous sling which is detachably connected to the other floor mounting. The chest strap may pass from the top mounting either over a shoulder or below the corresponding arm of the person. The length of the sling forming the chest strap and the hip strap is suitably adjustable.

An embodiment of a safety belt according to the invention will now be described with reference to the accompanying drawing.

Figure 2:
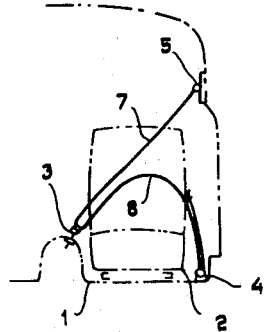
Figure 3:
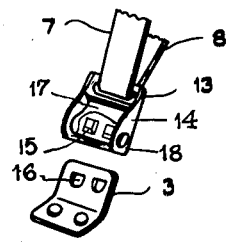

FIG. 1 is a lateral view of a driver strapped by a belt according to the invention, FIG. 2 a diagrammatic front view of the belt and its fastenings, and FIG. 3 a view of an unfastening device of the belt in detached position.

Referring to FIG. 1, the driver is seated on a seat 2 which is secured to the floor 1, FIG. 2. On each side of the seat a floor mounting 3 and 4 is secured to the floor or frame of the vehicle. A top mounting 5 is secured to the door post 6 of the vehicle on the same side of the seat as the floor mounting 4. The top mounting 5 is preferably on a level with the shoulder of the driver, or, as shown in the drawing, located somewhat higher depending on the size of the strapped person.

Connected with the top mounting 5 is one end of the belt which passes over one shoulder and obliquely across the chest of the driver and down to the other side of the seat to the floor mounting 3. The part of the belt which extends from this top mounting 5 to the floor mounting 3 forms the chest strap 7 of the safety strap.

As will be more fully described below, the belt is slidably connected with the floor mounting 3 and extends therefrom without interruption to the floor mounting 4 so as to form a hip strap 8. The parts 7 and 8 of the strap thus form a continuous sling. By means of a pivot 10, the mounting 4 is connected with a mounting 9 which consequently is able to adjust itself in the direction of the load acting on the strap. The end of the strap belt 8 is passed through an opening in the mounting 9 around a displaceable knurled pin 11 and is then doubled up along the entering part and kept closed to the hip strap by means of a runner 12. Due to this arrangement, the length of the belt 7, 8 can be easily adjusted.

To connect the belt 7, 8 slidably to the mounting 3, a loop portion of the belt is passed through a hoop 13 which in the illustrated embodiment forms an integral part of an attachment plate 14 provided with a pair of spaced bosses 15 arranged to enter corresponding spaced apertures 16 in the mounting 3 secured to the floor as the attachment plate 14 is moved from the position shown in FIG. 3 to the position shown in FIG. 1. Plate 14 is provided with side flanges between which a latching lever 17 is hingedly mounted by pintle 18. This latching lever functions to hold the bosses 15 engaged within the apertures 16, and the bosses can be released from the apertures by manipulating the latching lever 17 by means of a simple hand movement. Consequently, the safety belt is very easy to fasten and unfasten.

The mountings secured to the floor or frame of the vehicle constitute safe fastenings for the belt, and it will be apparent that the tension on the belt will not be transmitted to the seat or the members which connect the seat to the vehicle. The locations of the mountings result in that the chest strap and the hip strap even in the case of a violent collision effectively and in a physiologically favourable manner prevent the body of the strapped person from being thrown forward.

Instead of passing the chest strap from the mounting 3 over the shoulder it may pass under the arm of the person to the top mounting 5 which in this case may be placed somewhat lower as compared with the drawing.

Although but one embodiment has been described above and illustrated in the drawing, it will be obvious that the invention is not limited to this particular embodiment, which may be modified in various manners within the scope of the appending claims.

What I claim:
1. In combination with a vehicle comprising a body structure including a floor, a seat, a top mounting firmly secured to said body structure at a point substantially on a level with the shoulder of a person occupying the seat and floor mountings located respectively at opposite sides of the seat and secured to said body structure, a safety belt to protect the wearer thereof in said seat from being thrown forward upon any sudden deceleration of the vehicle, said safety belt comprising a chest strap extending obliquely across the chest of the wearer and a hip strap joined at one end thereof to the lower end of said chest strap and extending transversely across the wearer at the hip bones, the upper end of said chest strap being connected to said top mounting, one end of said hip strap being connected to that floor mounting which is located on the same side of the seat as said top mounting, said chest strap and said hip strap forming a continuous sling, and connecting means operable to detachably anchor that part of the safety belt formed by the junction between the lower end of said chest strap and the corresponding end of said hip strap to the other floor mounting so that said chest strap is maintained obliquely across the chest of the wearer and said hip strap is maintained transversely across the wearer at the hip joints notwithstanding the application of stress forces developed as a result of sudden deceleration of the vehicle.

2. A safety belt as defined in claim 1, wherein said chest strap and said hip strap are constituted by a continuous length of strap and wherein said connecting means includes a portion slidably engaging a loop portion of said continuous strap, said loop portion being located at said junction between the lower end of said chest strap and the corresponding end of said hip strap.

References Cited in the file of this patent

UNITED STATES PATENTS

| | | |
|---|---|---|
| 2,576,867 | Wilson | Nov. 27, 1951 |
| 2,705,586 | Young | Apr. 5, 1955 |
| 2,710,649 | Griswold | June 14, 1955 |
| 2,804,313 | Gilles | Aug. 27, 1957 |
| 2,864,437 | Spring | Dec. 16, 1958 |
| 2,880,788 | Phillips | Apr. 7, 1959 |